United States Patent
Fulbrook

(10) Patent No.: US 6,827,577 B1
(45) Date of Patent: Dec. 7, 2004

(54) NIGHT VISION GOGGLE TRAINING APPARATUS

(75) Inventor: Jim E. Fulbrook, Alexandria, VA (US)

(73) Assignee: DCS Corporation, Alexandria, VA (US)

( * ) Notice: Subject to any disclaimer, the term of this patent is extended or adjusted under 35 U.S.C. 154(b) by 86 days.

(21) Appl. No.: 10/217,444

(22) Filed: Aug. 14, 2002

(51) Int. Cl.$^7$ .............................................. F41A 33/00
(52) U.S. Cl. ........................... 434/11; 434/36; 359/410; 359/411; 359/480
(58) Field of Search .................... 434/11, 36; 359/410, 359/411, 480

(56) References Cited

U.S. PATENT DOCUMENTS

| | | | | |
|---|---|---|---|---|
| 4,202,601 A | * | 5/1980 | Burbo et al. ................. | 359/409 |
| 4,987,608 A | * | 1/1991 | Cobb .............................. | 2/6.2 |
| 5,413,483 A | * | 5/1995 | Witt, III ....................... | 434/11 |
| 5,420,414 A | * | 5/1995 | Wentworth .................. | 250/216 |
| 6,196,845 B1 | * | 3/2001 | Streid .......................... | 434/44 |

FOREIGN PATENT DOCUMENTS

| | | | | |
|---|---|---|---|---|
| WO | WO 9401850 A1 | * | 1/1994 | ........... G09B/11/00 |

OTHER PUBLICATIONS

US 20020130982A1, Marshall, "Apparatus for Providing a Simulated Night Vision Display", Sep. 19, 2002.*

* cited by examiner

Primary Examiner—Derris Banks
Assistant Examiner—Dmitry Suhol

(57) ABSTRACT

The night vision goggle training apparatus simulates the size, feel and handling of actual night vision goggles. A narrow band-width green filter is positioned over the viewing port, to simulate nighttime viewing conditions. The image intensification system used in night vision goggles is eliminated; limiting use of the training goggles to daytime use. The out of balance weight of the night vision goggles is identical to actual night vision goggles. Brightness control is simulated by attenuation filters that fit over the objective lens. The blooming effect of lights is simulated with a star filter. A thin, fine mesh screen is used to simulate reduced acuity, scintillation and ghosting effects during low light or rapid motion, which occur during use of actual night vision goggles. The objective focus and diopter adjustment are identical to night vision goggles. The cost per unit is about ten to twenty percent of the cost of actual night vision goggles, enabling a large force to be trained in the use of night vision goggles prior to deployment of the more expensive actual night vision goggles. The durability and life cycle of the night vision training goggles is greatly increased over actual night vision goggles. The field of view, magnification, acuity, weight, monochrome image color, depth perception, helmet/head mount assemblies, faceplate and eyecups of the simulated night vision goggles is similar or identical to actual night vision goggles.

22 Claims, 5 Drawing Sheets

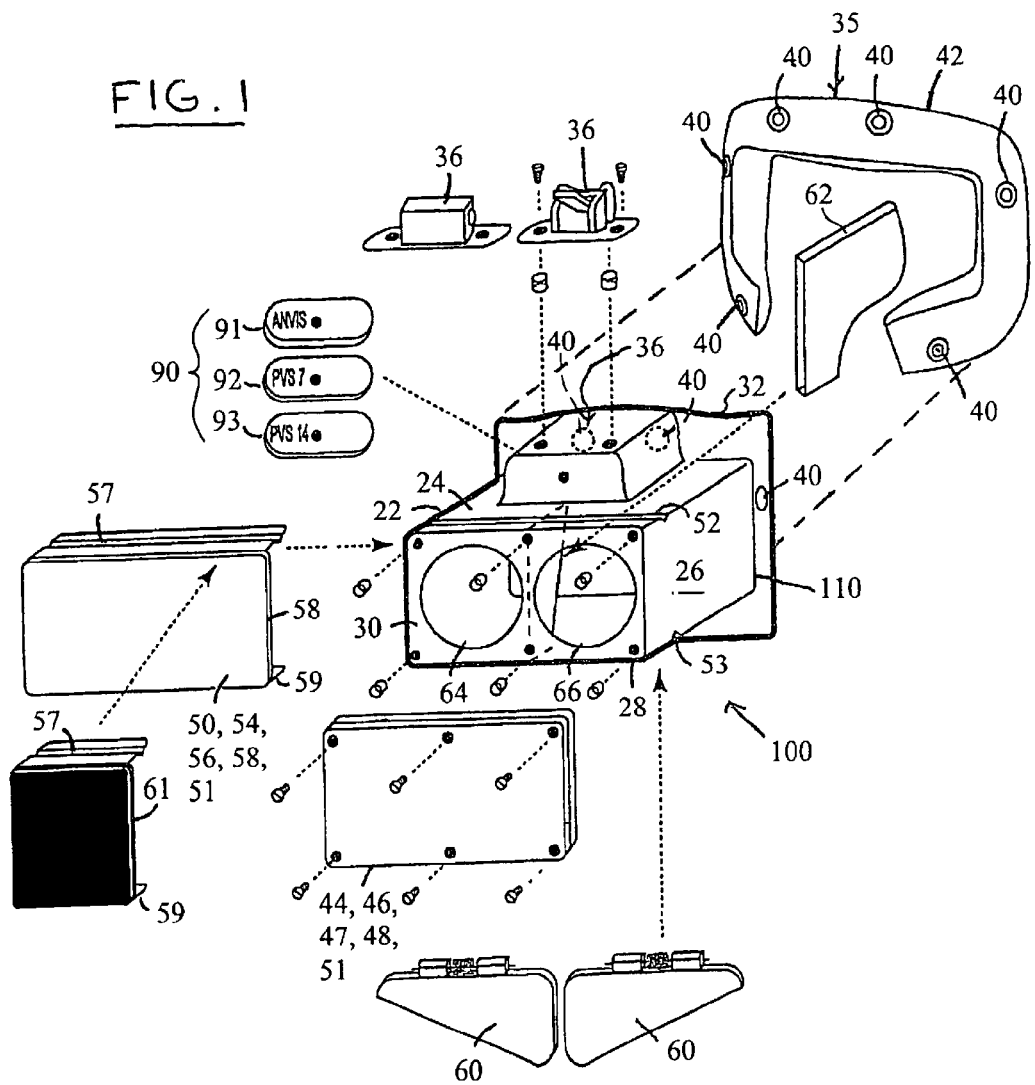

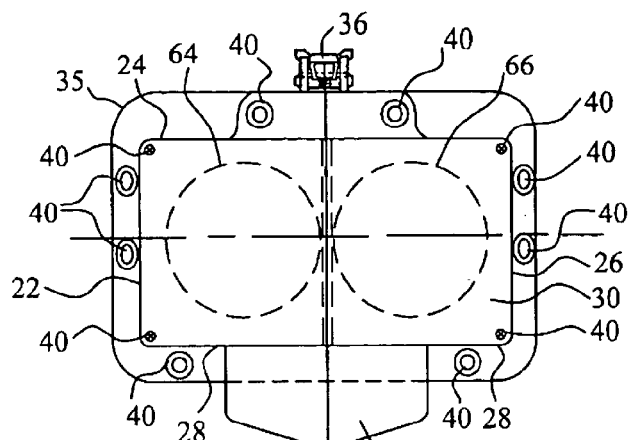
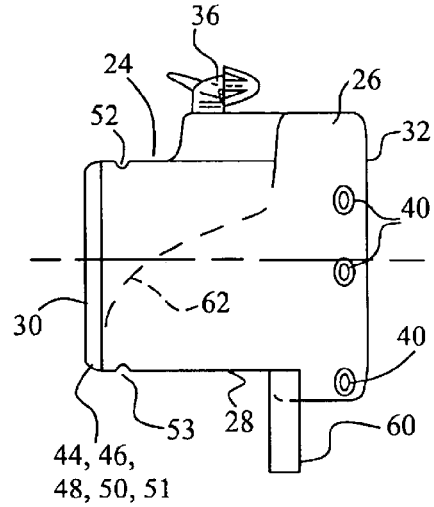
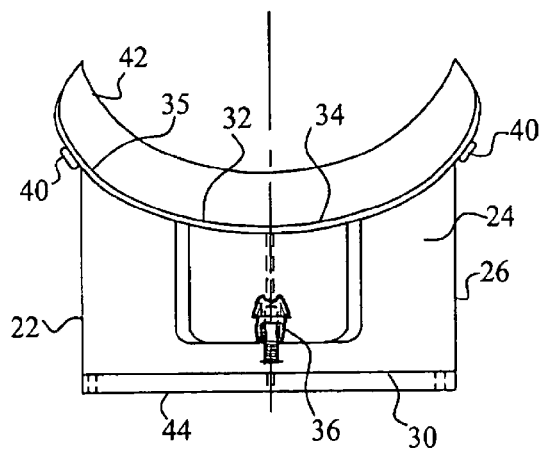
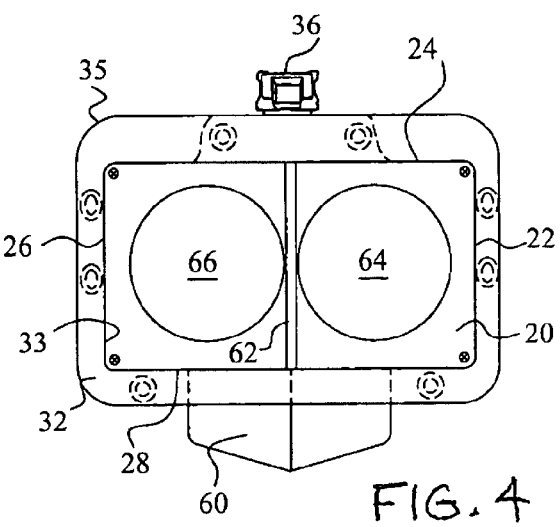

NIGHT VISION GOGGLE TRAINING APPARATUS

CROSS REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to night vision goggles, and more particularly to simulated night vision goggles, which simulate actual use of night vision goggles in the field during daylight conditions.

2. Description of the Prior Art

Night vision goggles have proven to be essential to pilots, police, and the military, during nighttime maneuvers. Night vision goggles display monochrome light with limited resolution and limited contrast, producing a limited depth of field and a narrow field of view. Night vision goggles are also heavy, and affect the user's balance, mobility, and movement. The combined optical and physical effects of night vision goggles often degrade a beginning user's performance. Therefore, training in the use of night vision goggles is important and at times critical, prior to engaging in difficult and dangerous activity at night. Night vision goggle users may be more easily and safely trained in daylight conditions, where the instructor can more easily observe the physical conditions of the environment, adding a margin of safety for the users of the night vision goggles during training, and allowing performance assessment of user activities.

U.S. Pat. No. 5,420,414 issuing to E. Wentworth on May 30, 1995, discloses a night vision goggle simulator utilizing a replaceable fiber optic lens assembly. This applicant patent uses a replaceable insert where the image intensification tube (light amplifying system) is located. However, instead of a fiber optic bundle used by Wentworth, applicant uses a simple direct view optical system comprised of lenses, a narrow band-width green filter, a mesh screen, a star filter and an optional prism (to invert images), as components of the viewing insert or apparatus.

U.S. Pat. No. 6,196,845 issuing to H. Streid on Mar. 6, 2001 discloses a visual display system for simulating night vision goggles across a large dynamic range.

U.S. Pat. No. 5,581,271 issuing to W. Kraemer on Dec. 3, 1996 discloses a head mounted visual display for simulation and training, utilizing a real time video image.

U.S. Pat. No. 5,413,483 issuing to F. Witt III, on May 9, 1995, discloses a night vision goggle simulator for night vision training. An instructor pilot uses a microprocessor based controller for controlling each of the six liquid crystals.

U.S. Pat. No. 4,948,957 issuing to G. Rusche on Aug. 14, 1990 discloses a method for training infrared imager users by making a video recording of an infrared scene, producing an infrared image from the recording and projecting the image onto a screen, and of converting the projected image into a visible image at a users infrared imager.

U.S. Pat. No. 4,202,601 issuing to J. Burbo et al. on May 13, 1980, discloses a training aid for use with a night vision apparatus, utilizing a variable density Polaroid filter array and blue-green filter mounted on a pair of goggles. The polarizing plates are varied to simulate nighttime conditions.

PCT patent application publication no. WO 01/33531 filed 29 Oct. 1999 discloses a simulated image low light viewing system utilizing a graphical or video image display which is projected in a region of the user's field of view.

The following U.S. Patents are representative of night vision goggles: U.S. Pat. Nos. 6,195,206; 6,088,165; 5,912,721; 5,852,291; 5,347,119; 5,331,459; 4,463,252; and DES351,397.

The following U.S. Patents are representative of mounting assemblies for mounting night vision equipment; U.S. Pat. Nos. 5,856,811; 5,726,671; 5,467,479; 5,448,318; 5,506,730; 5,408,086; 5,339,464; 5,307,204; 5,226,181; 5,225,932; 5,179,735; 4,907,296; 4,703,879; 4,697,783; 4,689,834; 4,670,912; 4,592,096; 4,449,787; and DES358,830.

BRIEF SUMMARY OF THE INVENTION

The night vision goggle training apparatus disclosed herein, simulates the size, feel, and handling of actual night vision goggles. A green filter lens is part of the optical components and is used to simulate nighttime goggle viewing conditions. The image intensification system used in night vision goggles is eliminated, limiting use of the training goggles to daytime conditions. A high intensity flashlight may be added to simulate an IR light source. A 3X magnification attachment, similar to the magnification attachment used on night vision goggles, and a compass attachment, may be used on the training goggles. The out of balance weight of the night vision goggles apparatus is identical to actual night vision goggles. Brightness control is simulated by an attenuation filter. The blooming effect of lights in night vision goggles may be simulated/indicated with a star filter. A thin mesh screen is used to reduce image acuity and to simulate scintillation or ghosting effects during low light or rapid motion, which occur during use of actual night vision goggles. The objective focus and diopter adjustment are identical to night vision goggles. The fatigue and stress is reduced, and daylight training with these training goggles allows gradual adjustment. The cost per unit is about ten to twenty percent of the cost of actual night vision goggles, enabling a large force to be economically trained in the use of night vision goggles prior to deployment of the more expensive actual night vision goggles. The durability and life cycle of the night vision training devices is very high (about 10 to 20 years), and use of the training devices will greatly increase the life cycle of the actual night vision goggles.

The field of view, magnification, acuity, weight, monochrome image color, depth perception, helmet/thead mount assemblies, faceplate and eyecups of the simulated night vision goggles are similar or identical to actual night vision goggles.

BRIEF DESCRIPTION OF SEVERAL VIEWS OF THE DRAWINGS

These and other features, aspects, and advantages of the present invention will become better understood with regard to the following description, appended claims, and accompanying drawings, wherein:

FIG. 1 is a perspective view of simulated night vision goggles.

FIG. 2 is a front view of the simulated night vision goggles shown in FIG. 1.

FIG. 3A is a side view of the simulated night vision goggles shown in FIG. 1.

FIG. 3B is a side view of a snap-on filter accessory, showing upper and lower extensions used to engage the first and second grooves in the custom housing.

FIG. 4 is a back view of the simulated night vision goggles shown in FIG. 1.

FIG. 5 is a top view of the simulated night vision goggles shown in FIG. 1.

These drawings are provided for illustrative purposes only and should not be used to unduly limit the scope of the present invention.

DETAILED DESCRIPTION OF THE INVENTION

The simulated night vision goggle apparatus 100, disclosed herein, may be used in a custom housing 110, similar to the housing shown in FIG. 1 through FIG. 5.

Figure 6:
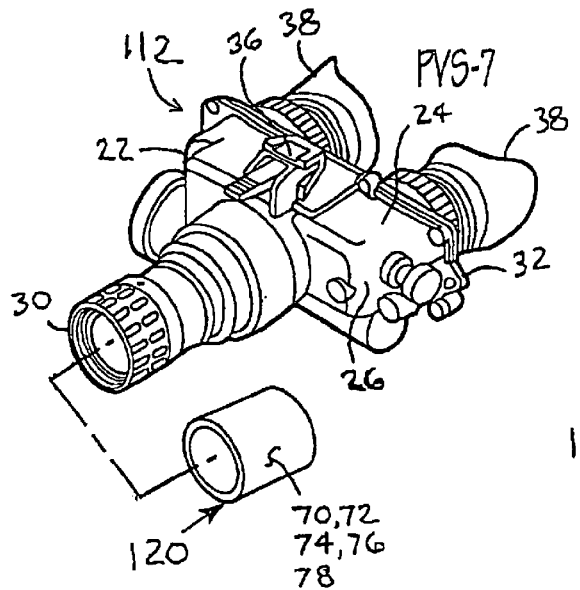
FIG. 6 is a perspective view of a standard PVS-7 night vision goggle, with optic filter insert shown adjacent to the night vision goggle.
Figure 7:
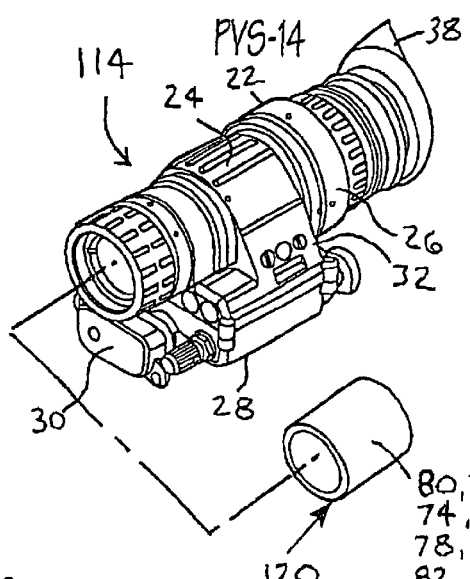
FIG. 7 is a perspective view of a standard PVS-14 night vision goggle, with an optic filter insert shown adjacent to the night vision goggle.
Figure 8:
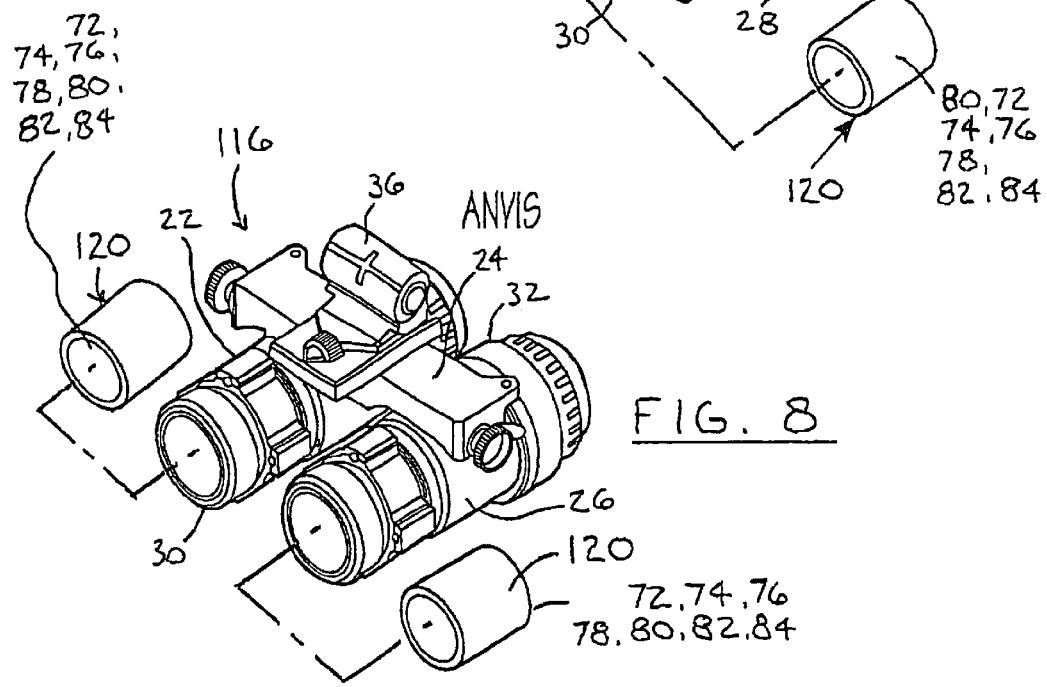
FIG. 8 is a perspective view of a standard ANVIS night vision goggle, with optic filter inserts shown adjacent to the night vision goggle.

Alternately, the simulated night vision goggle apparatus 100, disclosed herein, may be used to simulate night vision in the same way as actual night vision goggle housings 112, 114, 116 as shown in FIG. 6 through FIG. 8, with the expensive lens systems removed, and an optic filter insert 120 installed within the housing 110, in the same optical location as the image intensifier tube in an actual night vision goggle.

Figure 9:
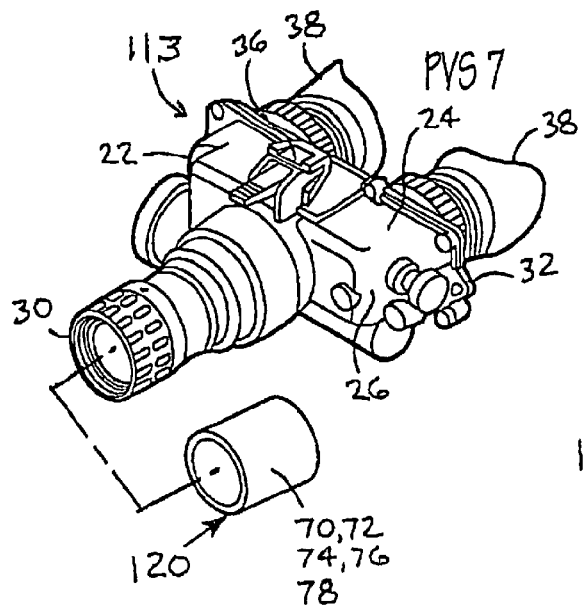
FIG. 9 is a an injection mold housing similar to the standard PVS-7 night vision goggle shown in FIG. 6, with an optic filter insert mounted in the lens housing.
Figure 10:
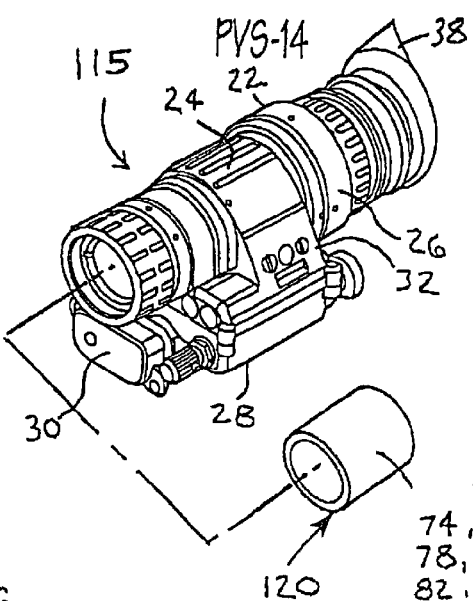
FIG. 10 is an injection mold housing similar to the standard PVS-14 night vision goggle shown in FIG. 7, with an optic filter insert mounted in the lens housing.
Figure 11:
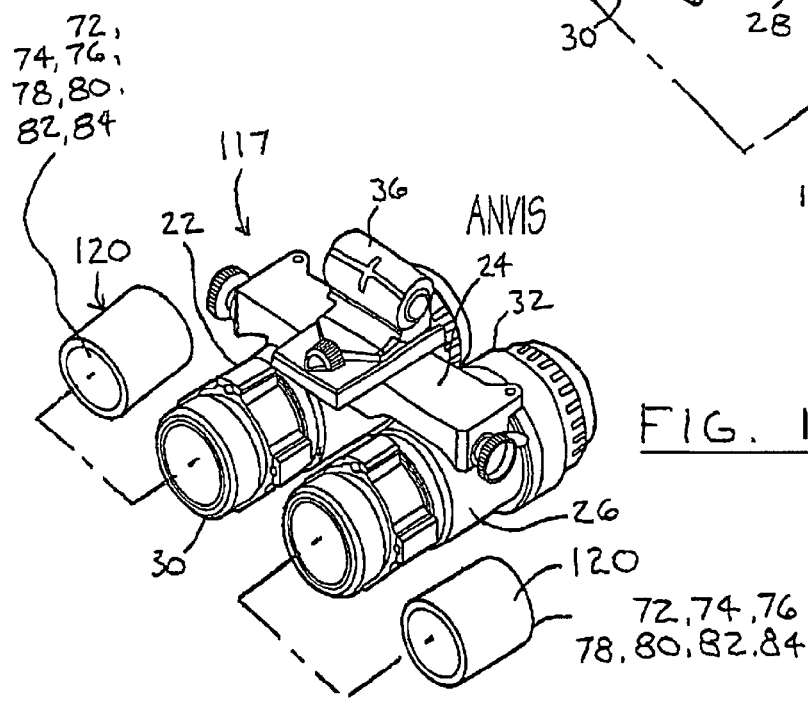
FIG. 11 is an injection mold housing similar to a standard ANVIS night vision goggle shown in FIG. 8, with optic filter inserts mounted in each lens housing.

The simulated night vision goggles 100 image filtering combination may also be adapted for use with molded housings 113, 115, 117, as shown in FIG. 9 through FIG. 11, used on actual night vision goggles, and shown with the simulator insert 120.

A high intensity flashlight may be added to simulate an IR light source. A 3X magnification attachment, and a compass attachment, may also be used on the training goggles.

As shown in FIG. 1 through FIG. 5, the simulated night vision goggles 100 comprise a housing 110 having a left side 22, a top side 24, a right side 26, a bottom side 28, a front side 30 and a back side 32. The back side 32 includes a large aperture 33 forming an interior chamber 20 bounded by the left side 22, to top side 24, the right side 25, the bottom side 28 and the front side 30. The back side 32 has a face guard 35, which is preferably curved 34 to fit the contour of a user's face, as best shown in FIG. 5.

A latch assembly 36 is provided to releasably secure the housing 110 to a user's headgear or helmet (not shown). The latch assembly 36 is preferably a spring loaded latch assembly 36 compatible with standard night vision goggle head mount and helmet assemblies, typically located on the top side 24 of the housing 110. Snaps, hook and loop fasteners, screws, and sleeves, or other known releasable fastening means 40 may also be provided to releasably secure the housing 110 to the user's headgear and/or to a suitable face cushion 42, and to attach the green filter 50, star filter 51, and a mesh screen 48 to the housing 110. Preferably, the face cushion 42 is made of real or simulated leather or lamb skin, and curves 34 to conform to a users face, as best shown in FIG. 5.

The front side 30 of the housing 110 is sized to receive an optic filter attachment 44, such as a Plexiglas cover 46, a mesh screen 48, a green filter 50 and a star filter 51. First and second grooves 52, 53 are provided for ease of attachment of additional optic filters 54, such as a neutral density filter 56, or a green filter 50. Preferably, the filter attachments are snap-on filters 58, as best shown in FIG. 3B. Snap-on filters 58 include upper and lower extensions 57, 59 which engage the first groove 52 located on the top side 24 of the custom housing 110, and a second groove 53 located on the bottom side 28 of the custom housing 110.

Weights 90 are preferably added to the night vision goggle training apparatus 100, as shown in FIG. 1, to simulate the actual weight of various night vision goggles. Weight 91 simulates the actual weight of ANVIS night vision goggles. Weight 92 simulates the actual weight of PVS-7 night vision goggles. Weight 93 simulates the actual weight of PVS-14 night vision goggles. These weights 91, 92, 93 are selected to train the user in actual night vision goggle use, and each weight 90 may be used on the night vision goggle training apparatus 100 disclosed herein.

As shown in FIG. 2, FIG. 3 and FIG. 4, a light guard 60 is made of opaque flexible material, and positioned to extend below the bottom side 28 of the housing 110, in a manner to prevent light leaks in proximity to the user's neck, jaw or lower face region. The light guard is hinged to raise up so look-under capability is possible for users.

A partition 62 extends within the housing 110 between a first viewing aperture 64 and a second viewing aperture 66, as best shown in FIG. 4. The first viewing aperture 64 and the second viewing aperture 66 extend through the front side 30 of the housing 110, as shown in FIG. 3A and FIG. 4. The partition 62 prevents both eyes from seeing through the opposite aperture, and is formed as shown in dashed line in FIG. 3 and FIG. 5. The partition 62 may be molded as part of the housing 110, or a pliable part may be added at assembly. The partition 62 is shaped to avoid contact with the users nose, when the housing 110 is positioned upon the users face. The pliable part of the partition will prevent injury if contact with the user's nose occurs.

A first groove 52 and second groove 53 are preferably provided on the top side 24 and bottom side 28 of the custom housing 110, in proximity to the front side 30 of the custom housing 110, as shown in FIG. 3A. The first and second grooves 52, 53 are provided for ease of adding snap-on accessories 58, such as a fine mesh screen 48, used to simulate a step-down in grain (reduced acuity) in the viewed image, when seen through the first and second viewing apertures 64, 66.

Snap-on accessories 58 preferably have an upper extension 57 positioned to engage the first groove 52 located on the top side 24 of the custom housing 110, and a lower extension 59 positioned to engage the second groove 53 located on the bottom side 28 of the custom housing 110, as best shown in FIG. 3B. In this embodiment, the snap-on accessories 58 are easily slidable on or off the custom housing 110, without requiring tools. Snap-on accessories include green, narrow band-width filters to simulate brightness (gain) adjustments, and a metal cover 61 where no light enters through either aperture to simulate the monocular night viewing device (PVS-14).

As shown in FIG. 6, a PVS-7 housing 112 may be used, with the expensive image intensification tube removed, and an inexpensive optic filter insert 120 positioned within the housing 112. The optic filter insert 70 preferably comprises: a fine mesh screen 72 similar to the fine mesh screen 48 used in housing 110, one or more intermediate lenses 74, a green narrow band-width filter 76 similar to the green filter used in housing 110. A star pattern flat plate filter 78, may also be incorporated into the optic lens insert 70.

The PVS-7 housing 112 will provide a custom fit, weight, size and feel similar to an actual PVS-7 housing, with identical control positions, enabling the user to become familiar with the control positions on actual night vision goggles.

As shown in FIG. 7, a PVS-14 housing 114 may be used, with the expensive image intensification tube removed, and an inexpensive alternate optic filter insert 80 positioned within the housing 114. The alternate optic filter insert 80 preferably comprises: a fine mesh screen 72 similar to the fine mesh screen 48 used in housing 110, one or more intermediate lenses 74, a green narrow band-width filter 76 similar to the green filter used in housing 110. A star pattern flat plate filter 78, and an image inverter 84 may also be incorporated into the alternate optic lens insert 80. The image inverter 84 in the PVS-14 housing preferably incorporates a PORRO or ABBE prism 82. The PVS-14 housing 114 will provide a custom fit, weight, size and feel similar to an actual PVS-14 housing 114, with identical control positions to improve daylight training simulation.

As shown in FIG. 8, an ANVIS housing 116 may also be used, with the expensive image intensification tube removed, and an inexpensive alternate optic filter insert 80 positioned within the housing 114. The alternate optic filter insert 80 preferably comprises: a fine mesh screen 72 similar to the fine mesh screen 48 used in housing 110, one or more intermediate lenses 74, a green narrow band-width filter 76 similar to the green filter used in housing 110. A star pattern flat plate filter 78, and an image inverter 84 may also be incorporated into the alternate optic filter insert 80. The image inverter will incorporate a PORRO or ABBE prism 82. The ANVIS housing 116 will provide a custom fit, weight, size and feel similar to an actual ANVIS housing 116, with identical control positions to improve daylight training.

FIG. 9 is a perspective view of an injection molded PVS-7 housing 113, which is molded to simulate the size, weight, control positions and feel of an actual PVS-7 night vision goggle housing 112, with the expensive image intensification tube and electrical control unit removed, and an inexpensive optic filter insert 70 positioned within the housing 112. The optic filter insert 70 preferably comprises: a fine mesh screen 72 similar to the fine mesh screen 48 used in housing 110, one or more intermediate lenses 74, a green narrow band width filter 76 similar to the green filter used in housing 110. A star pattern flat plate filter 78 is also incorporated into the optic lens insert 70. The PVS-7 injection molded housing 113 will provide a custom fit, weight, size and feel similar to an actual PVS-7 housing 112, with identical control positions.

As shown in FIG. 10, an injection molded PVS-14 housing 115 may be used, with the expensive image intensification tube removed, and an inexpensive alternate optic filter insert 80 positioned within the housing 114. The alternate optic filter insert 80 preferably comprises: a fine mesh screen 72 similar to the fine mesh screen 48 used in housing 110, one or more intermediate lenses 74, a green narrow band-width filter 76 similar to the green filter used in housing 110. A star pattern flat plate filter 78, may also be incorporated into the optic lens insert 70.

Additionally, the injection molded PVS-14 113 housing will incorporate an alternate optic lens insert 80 incorporating a PORRO or ABBE prism 82 to invert the image. The injection molded PVS-14 housing 113 will provide a custom fit, weight, size and feel similar to an actual PVS-14 housing 114, with identical control positions to improve daylight training.

As shown in FIG. 11, an injection molded ANVIS housing 117 may be used, with the expensive image intensification tubes removed, and inexpensive alternate optic filter insert 80 positioned within the injection molded housing 117. The alternate optic filter inserts 80 preferably each comprise: a fine mesh screen 72 similar to the fine mesh screen 48 used in housing 110, one or more intermediate lenses 74, a green narrow band-width filter 76 similar to the green filter used in housing 110. A star pattern flat plate filter 78, and an image inverter 84 will also be incorporated into the alternate optic filter insert 80.

Additionally, the injection molded ANVIS housing 117 will preferably incorporate an image inverting insert 80 incorporating a PORRO or ABBE prism 82. The injection molded ANVIS housing 117 will provide a custom fit, weight, size and feel similar to an actual ANVIS housing 116, with identical control positions to improve daylight training.

Figure 12:
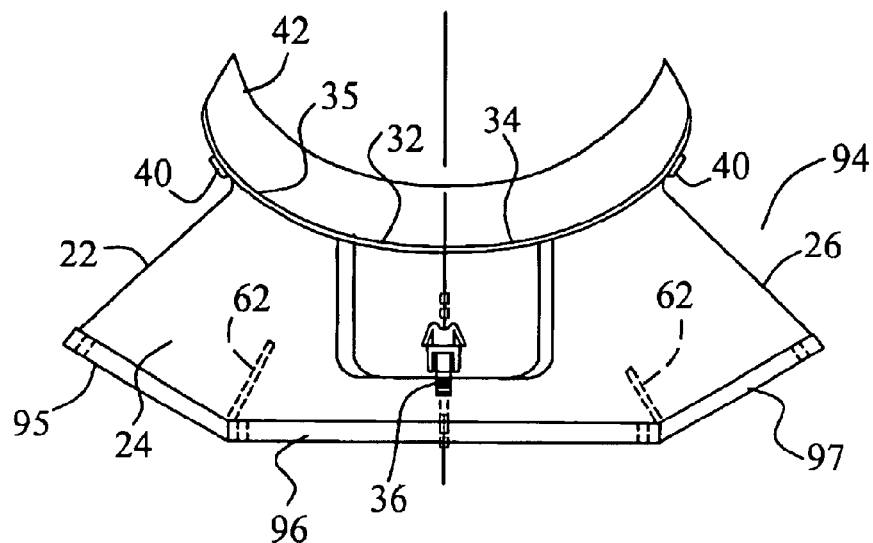
FIG. 12 is a top view of a wide field of view night vision goggle training apparatus.

FIG. 12 is a top view of a custom, wide field of view night vision goggle training apparatus 94. The field of view shown in FIG. 2 is modified to include an angled left side 95, a front side 96, and an angled right side 97. This effectively increases the field of view to 100 degrees or more.

Figure 13:
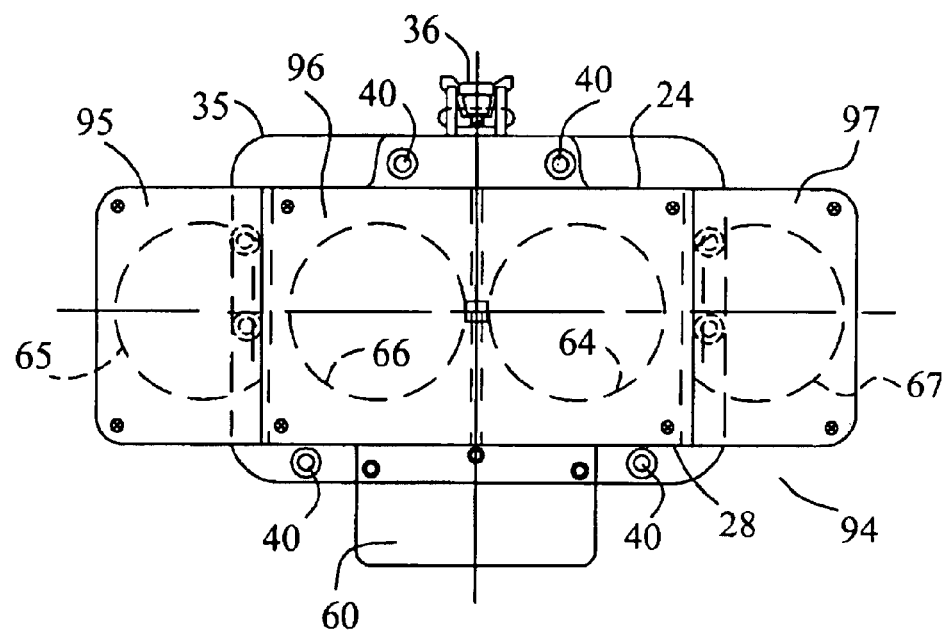
FIG. 13 is a front view of the wide field of view night vision goggle training apparatus shown in FIG. 12.

FIG. 13 is a front view of the custom, wide field of view 94 night vision goggle training apparatus 102, shown in FIG. 12. The filters 44, 46 (shown in FIGS. 2, 3 and 4) are adapted to conform to the wide angled field of view 94. Note that four apertures 64, 65, 66 and 67 are used to create the wide angled field of view 94. Two additional pliable partitions 62 are used to separate the four apertures 64, 65, 66, 67. The partitions 62 prevent both eyes from seeing through the adjacent aperture. As previously noted, the pliable partition 62 may be molded as part of the housing 102, or a pliable part may be added at assembly. The partitions are preferably shaped to avoid contact with the user, when the housing 102 is positioned upon the user's face.

In use, the simulated night vision goggle apparatus 100 is worn in daylight conditions to train future users to wear and operate actual night vision goggles. The instructor will be able to observe the trainees and the surrounding terrain under daylight conditions, to improve safety and performance. The simulated night vision goggles will train users with inexpensive equipment that effectively simulates actual night vision goggle use. This provides a low cost training alternative, enabling the user of night vision goggles to develop the skills required to master the use of actual night vision goggles, before embarking on dangerous and unknown situations.

The user will place the face guard 35 located on the back side 32 of the simulated night vision goggles 100 against their face, positioning their nose and eyes within the interior chamber 20 in the housing 102. The partition 62 is positioned within the custom housing 102 against the front side 30 of the housing 102, to avoid direct contact with the user's nose during use. First and second apertures 64, 66 are positioned on each side of the partition 62, enabling the user to view two distinct views through the simulated night vision goggles 100. This improves depth perception, while simulating actual conditions of night goggle use.

The simulated night vision goggles 100 disclosed herein have a curved face guard 35, 34, which preferably includes a face cushion 42 for comfort, and to reduce stray light penetration 42, 60 during use. The simulated night vision goggles 100 includes a latch assembly 36 compatible with a user's helmet or headgear to simulate actual use. The latch assembly 36 is preferably a spring loaded latch mechanism sized to engage and selectively release the simulated night vision helmet or headgear. Additional snaps, hook and loop fasteners, or other known releasable fastening means 40 are preferably provided to secure the simulated night vision goggle housing 110 to the face cushion 42, and to the helmet or headgear 38.

Multiple filter attachments 44 are releasably secured to the front side 30 of the simulated night vision goggles 100. One such filter attachment 44 is a Plexiglas cover 46. Another attachment is a fine mesh screen known to simulate the grain structure of actual night vision goggles 112, 114 or 116. Another attachment is a green narrow band-width filter. Additional filters 54 may be added, such as neutral density filter 56 and/or a star pattern flat plate filter 78, to simulate various night vision conditions. Preferably, a prism image inverter 84 is also provided as part of the optic filter insert 80.

First and second grooves 52, 53 are provided for ease of attaching additional filters 54. Preferably, the first groove 52 extends across the top side of the custom housing 110, and the second groove 53 extends across the bottom side of the simulated night vision goggle housing 110. The additional filters 54 preferably have upper and lower extensions 57, 59, which are positioned to engage the first and second grooves 52, 53 to releasably secured the additional filters 54 to the custom housing 110.

A flexible hinged light guard 60 is attached to the custom housing 110 beneath the bottom side 28, to prevent light leaks in proximity to the user's neck.

As previously noted, the simulated night vision goggle assembly 100 may utlize a custom housing 110, actual PVS-7, PVS-14 or ANVIS housings 112, 114, 116, or injection molded PVS-7, PVS-14 or ANVIS housings 113, 115, 117, without departing from the scope of this disclosure, or the following claims.

The cost per unit is about ten to twenty percent of the cost of actual night vision goggles, enabling a large force to be trained in the use of night vision goggles prior to deployment of the more expensive actual night vision goggles. The durability and life cycle of the night vision training goggles is greatly increased over actual night vision goggles.

Weights 90 are preferably added to the night vision goggle training apparatus 100, as shown in FIG. 1, to simulate the actual weight of various night vision goggles. Weight 91 simulates the actual weight of ANVIS night vision goggles. Weight 92 simulates the actual weight of PVS-7 night vision goggles. Weight 93 simulates the actual weight of PVS-14 night vision goggles. These weights 91, 92, 93 are selected to train the user in actual night vision goggle use, and each weight 90 may be selectively used on the night vision goggle training apparatus 100 disclosed herein. In the wide field of view apparatus shown in FIG. 12 and 13, only a single weight would be used to equal the weight of the system.

The custom night vision goggle training apparatus 94 shown in FIG. 12 and FIG. 13, provides a wide field of view, not provided by custom housing 110. The field of view is modified in FIG. 12 to include an angled left side 95, a front side 96, and an angled right side 97. This effectively increases the field of view to 100 degrees or more.

FIG. 13 is a front view of the custom, wide field of view night vision goggle training apparatus 94, shown in FIG. 12. The filters 44, 46 are adapted to conform to the wide angled field of view 94. Note that four apertures 64, 65, 66 and 67 are used to create the wide angled field of view 94. Two additional pliable partitions 62 are used to separate the four apertures 64, 65, 66, 67. The partitions 62 prevent both eyes from seeing through the adjacent aperture.

Although the invention has been described herein by way of exemplary embodiments, variations in the structure and methods described herein may be made without departing from the spirit and scope of the invention. For example, the invention has been disclosed with a custom housing 110. Also shown are actual night vision goggle housings, which may alternately be used. A third embodiment is provided with molded housings which closely replicate actual night vision goggle housings. One of average skill in this art may readily adapt the custom housing 110, without departing from the spirit or scope of this disclosure, or the following claims.

What is claimed is:

1. A night vision goggle training apparatus, comprising:
    a) a custom housing having a left side, a top side, a right side, a bottom side, a front side and a back side, with an interior chamber on the back side sized to contain a user's nose and eyes therein, and a first front aperture and a second front aperture positioned in side by side relation on the front side of the custom housing;
    b) a pliable partition positioned within the custom housing, the partition positioned between the first viewing aperture and the second viewing aperture to prevent one eye from viewing through the aperture intended for the other eye, the partition cut away to avoid contact with a user's nose;
    c) a flexible face cushion mounted to the back side of the custom housing, the face cushion curved to fit and conform to the contour of a user's face;
    d) a latch assembly mounted upon the top side of the custom housing, the latch sized to releasably secure the custom housing to an existing headgear or helmet;
    e) an optic filter attachment releasably secured to the front side of the custom housing, the optic filter attachment further comprising a transparent cover; a fine mesh screen, and a green filter, for daylight training; and
    f) a weight bar attachment positioned on the custom housing, with selected weights attached to the weight bar attachment to match the weight of an actual night vision goggle training apparatus.

2. The night vision goggle training apparatus of claim 1, wherein the custom housing is an actual night vision goggle housing selected from one of: a PVS-7 housing; a PVS-14 housing; and an ANVIS housing, with an actual image intensifier tube removed, and a filter and lens insert positioned within the existing housing, for daylight training.

3. The night vision goggle training apparatus of claim 2, wherein the filter insert includes one of: a PORRO and ABBE type prism image inverter, when image inversion is used.

4. The night vision goggle training apparatus of claim 1, wherein the custom housing comprises an injection molded housing with a size, shape, weight and configuration similar to an actual night vision goggle housing, with an actual image intensifier tube removed, and a filter and lens insert positioned within the injection molded housing, for daylight training.

5. The night vision goggle training apparatus of claim 4, wherein the filter insert does not include an image inverter when using a PVS-7 insert.

6. The night vision goggle training apparatus of claim 1, wherein the face cushion is made of one of: leather, lamb skin, simulated leather, or simulated lamb skin.

7. The night vision goggle training apparatus of claim 1, wherein a first groove is provided on the top side of the custom housing, and a second groove is provided on the bottom side of the custom housing, for ease of mounting a snap-on optic filter to the front side of the custom housing.

8. The night vision goggle training apparatus of claim 7, wherein a first groove is provided on the top side of the custom housing, and a second groove is provided on the bottom side of the custom housing, and at least one of the optic filter attachments is a snap-on optic filter attachment, with an upper extension and a lower extension sized to engage the first and second grooves located on the custom housing.

9. The night vision goggle training apparatus of claim 1, wherein the green filter is a narrow band-width green filter.

10. The night vision goggle training apparatus of claim 1, wherein the optic filter assembly includes a star pattern flat plate filter.

11. The night vision goggle training apparatus of claim 4, wherein the optic filter attachment includes one of: an ABBE prism and a PORRO type prism image inverter.

12. The night vision goggle training apparatus of claim 1, wherein a flexible light guard extends below the bottom side of the housing to prevent light leaks in proximity to a user's neck or jaw or lower face portion, and the flexible light guard is hinged so that the flexible light guard may be selectively raised or lowered during use to provide look under capability.

13. The night vision goggle training apparatus of claim 4, wherein at least one eye guard extends from the molded housing to shield and conform to the contour about a user's eyes, to exclude penetration of external light to the user's eyes, during daylight use.

14. The night vision goggle training apparatus of claim 1, wherein a metal cover is provided to selectively cover one aperture, to provide viewing through the uncovered aperture only.

15. A night vision goggle training apparatus, which comprises:
   a) a custom housing having a left side, a top side, a right side, a bottom side, a front side and a back side, with an interior chamber on the back side sized to contain a user's nose and eyes therein, and a first front aperture and a second front aperture positioned in side by side relation on the front side of the custom housing;
   b) a pliable partition positioned within the custom housing, the pliable partition positioned between the first viewing aperture and the second viewing aperture to prevent both eyes from focusing on the same spot, the pliable partition cut away to avoid contact with a user's nose;
   c) a face cushion mounted to the back side of the custom housing, the face cushion curved to fit and conform to the contour of a user's face;
   d) a latch assembly mounted upon the top side of the custom housing, the latch sized to releasably secure the custom housing to an existing headgear or helmet;
   e) an optic filter attachment releasably secured to the front side of the custom housing, the optic filter further comprising a transparent cover; a fine mesh screen, and a green filter for daylight training;
   f) a first groove is provided on the top side of the custom housing, and a second groove is provided on the bottom side of the custom housing, at least one optic filter attachment is a snap-on optic filter, with an upper extension and a lower extension sized to engage first and second grooves located on the custom housing, for ease of mounting the snap-on optic filter to the front side of the custom housing; and
   g) a weight bar attachment positioned on the top side of the custom housing, with selected weights attached to the weight bar attachment to match the weight of an actual night vision goggle training apparatus.

16. The night vision goggle training apparatus of claim 15, wherein the four viewing apertures are positioned in side by side relation, and the four viewing apertures are sized to provide a wide field of view of at least 100 degrees, and the filter attachments are sized to accommodate the wide field of view.

17. The night vision goggle training apparatus of claim 15, wherein the custom housing is an actual night vision goggle housing selected from one of: a PVS-7 housing, a PVS-14 housing, and an ANVIS housing, with an image intensification tube and an electrical control unit removed, and a filter insert and an image inverter positioned within the existing housing, for daylight training.

18. The night vision goggle training apparatus claim of 15, wherein the custom housing comprises an injection molded housing with a size, shape, weight and configuration similar to an actual night vision goggle housing, with the image intensification tube and an electrical control unit removed, and a filter insert and an image inverter positioned within the injection molded housing, for daylight training.

19. The night vision goggle training apparatus of claim 15, wherein the green filter is a narrow band-width green filter.

20. The night vision goggle training apparatus of claim 15, wherein the optic filter attachment includes one of: an ABBE prism and a PORRO type prism image inverter.

21. The night vision goggle training apparatus of claim 15, wherein at least one opaque eye guard extends from the molded housing to shield and conform to the contour about a user's eye, to exclude external light during daylight use.

22. A night vision goggle training apparatus, which comprises:
   a) a custom injection molded housing similar in size, weight and configuration to one of a PVS-7 housing, a PVS-14 housing, an ANVIS housing;
   b) at least one flexible, opaque eye guard mounted to the back side of the custom housing, the flexible, opaque eye guard sized to fit and conform about a user's eye to shield light from about the flexible, opaque eye guard;

c) a latch assembly mounted upon the top side of the custom housing, the latch sized to releasably secure the custom housing to an existing headgear or helmet;

d) an optic filter insert inserted into the custom injected molded housing, the optic filter insert further comprising a transparent cover; a fine mesh screen, a narrow band-width green filter, a star pattern flat plate filter, a PORRO or ABBE prism image inverter; and e) a weight bar attachment positioned on the custom housing, with selected weights attached to the weight bar attachment to match the weight of an actual night vision apparatus;

wherein the simulated night vision goggle apparatus simulates actual night vision goggles, for daylight training.

* * * * *